Sept. 8, 1964  B. GLYNN  3,147,508
ATTACHMENT CLIP FOR AUTOMOBILE WINDSHIELD WIPERS
Filed Oct. 14, 1963
FIG. 1
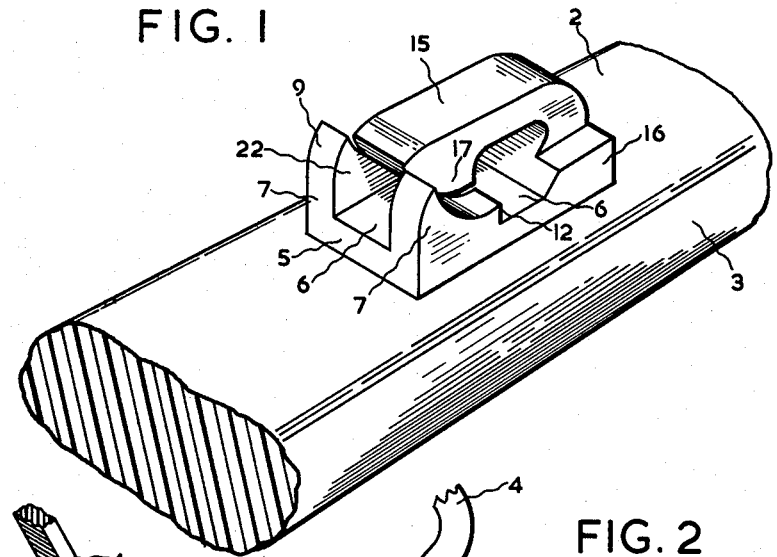
FIG. 5
FIG. 2
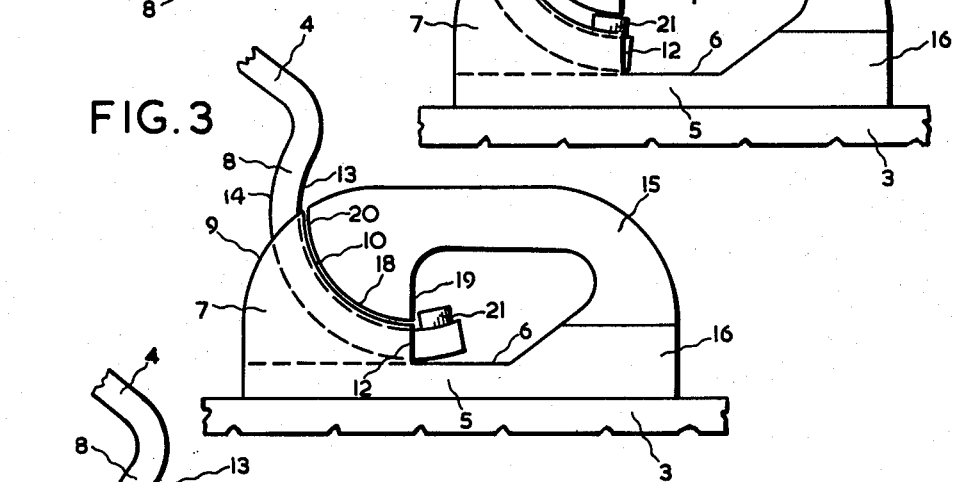
FIG. 3
FIG. 4
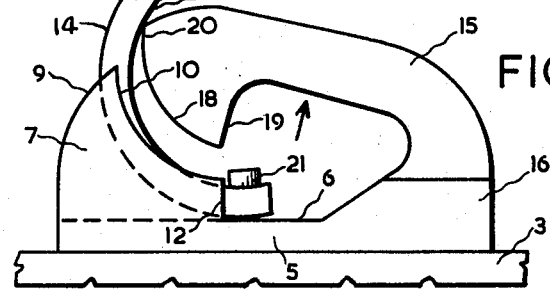
INVENTOR
BRIAN GLYNN
BY: Fetherstonhaugh & Co.
ATTORNEYS United States Patent Office 3,147,508
Patented Sept. 8, 1964

3,147,508
ATTACHMENT CLIP FOR AUTOMOBILE
WINDSHIELD WIPERS
Brian Glynn, Dundas, Ontario, Canada, assignor to Tridon Manufacturing Limited, Hamilton, Ontario, Canada
Filed Oct. 14, 1963, Ser. No. 315,919
5 Claims. (Cl. 15—250.32)

My invention relates to improvements in automobile windshield wipers and the object of the invention is to provide a novel clip arrangement mounted upon the face of the usual windshield wiper pressure distributing superstructure provided to support the usual squeegee wiper blade, the clip being arranged for attachment to the free end of a known type of oscillatably mounted windshield wiper supporting arm and which consists of a slender metal bar of rectangular cross-sectional shape and formed with a curved free end portion carrying a clip engaging locking stud upon its concave face.

This invention is more particularly provided for use in conjunction with a windshield wiper pressure distributing superstructure formed of moulded plastic material, such as disclosed in my continuation-in-part patent application "Windshield Cleaners" Serial No. 287,573, filed June 13, 1963, and the object of the invention is to furnish a clip integrally formed of plastic material possessing a certain degree of bendable resiliency, the clip being provided with an open ended grooved portion for reception of the curved end of the said type of supporting arm, the outer portion of the groove being capped by a resilient keeper latch extending lengthwise of the groove and carrying a tooth which prevents withdrawal of the curved end of a supporting arm seated within the groove through engagement with the stud protruding from the concave face of such curved portion of the arm.

A further and particular object of the invention is to so space the keeper latch in relation to the base of the groove that a contained curved supporting arm end is permitted free to and fro radial movement within the groove, the keeper latch projecting from one end of the base of the clip and extending in parallel relation to the groove, the free end of the keeper latch being curved upwardly from its groove overlapping bottom face for the purpose of providing clearance to permit the pressure distributing superstructure and its supported squeegee blade to have required rocking freedom in relation to a windshield wiper supporting arm when wiping movement is applied to a curved windshield.

With the foregoing and other objects in view as shall hereinafter appear, the invention consists of a novel clip for attaching an automobile windshield wiper pressure distributing superstructure to a windshield wiper supporting arm, the clip being formed and arranged all as hereinafter more particularly described and illustrated in the accompanying drawing, in which:

FIG. 1 is a perspective view of the clip attached to a fragmentary portion of a windshield wiper pressure distributing superstructure.

FIG. 2 is a side elevational view of the clip and a fragmentary portion of the supporting arm and showing the curved end of the windshield wiper supporting arm partly inserted into the clip.

FIG. 3 is a similar view of FIG. 2 and showing the curved end of the windshield wiper supporting arm completely inserted and locked within the clip.

FIG. 4 is also a similar view to FIG. 2 and showing the curved end of the windshield wiper supporting arm being removed from the clip, and FIG. 5 is a perspective view of the curved end portion of the windshield wiper supporting arm.

The clip is preferably integrally formed of moulded plastic material having a certain degree of bendable resiliency, and in practice is relatively small as it is dimensioned to be mounted upon a windshield wiper backing member of standard size wherein, referring to FIG. 1, the portion of the face 2 of the backing member 3, upon which the clip is mounted is about one-half inch wide and the standard windshield wiper supporting arm 4, referring to FIG. 2, less than one quarter inch wide.

The clip comprises an oblong base plate 5 having an exposed face 6 and mounted to rest upon and be secured to the face 2 of the pressure distributing superstructure 3. A pair of spaced apart parallel flanges 7 protrude upwardly from one end portion of the exposed face 6 of the base plate 5 and in conjunction with the exposed face of the base plate define an open ended groove extending in lengthwise relation to the base plate 5 and the pressure distributing superstructure 3, and for reception of the curved end 8 of the supporting arm 4. The flanges 7 are of somewhat triangular shape each having a front convex face 9 and a rear concave face 10 extending upwardly from a vertical rear face 12 which is of slightly greater height than the thickness of the curved portion 8 of the supporting arm 4, such thickness being the distance between the upper concave face 13 and lower convex face 14 of the curved portion.

A resilient keeper latch 15 is carried upon a lateral rib portion 16 of the base plate and which is of substantially the same height as the height of rear faces 12 of the flanges 7, the rib extending across the end of the base plate 5 remote from the flanges. The free end of the keeper latch is in alignment with and extends to the groove formed between the flanges 7. The lower portion of the free end of the keeper latch is formed with a downwardly protruding wedge shaped tooth 17 which is of substantially the same length as the distance between the flanges 7 and formed with an outer convex face 18 and an inner vertical face 19 positioned above and in substantial alignment with the inner faces 12 of flanges 7. The free end of the keeper latch terminates in an upwardly curved convex end face 20 which is a prolongation of the convex tooth face 18 and in conjunction with such face presents a surface having a curvature which is substantially complementary to the curvature of the concave face 13 of the curved end 8 of a supporting arm 4.

The flanges 7 are so spaced that the distance between their inner opposite faces is only slightly greater than the width of the curved end 8 of the supporting arm and between which faces the end 8 is received. The concave face 13 of the end 8 carries a stud 21 protruding upwardly from the face in the vicinity of the free end of the face and which acts as a stop for retention of the curved end 18 of the supporting arm 4 within the clip. Upon reference to FIG. 1, it will be seen that the opposite faces of the flanges 7 together with the exposed face 6 of the base plate 5 and the convex end of the keeper latch and its tooth 17 provide a socket 22 for inserted reception of the curved end 8 of the arm 4 and in which the end 8, when locked within the clip, has sufficient clearance to allow relative rocking motion between the arm and clip.

Prior to insertion of the curved end 8 of the arm 4 into the clip the keeper latch 15 of the clip is in its normal downward position as shown in FIG. 4. In inserting the end 8 into the clip its stud carrying end is inserted into the socket 22 with the stud 21 uppermost and with its convex face 14 resting upon the portion of the base plate surface between the flanges 7. As the end 8 is pushed inwardly the top of the stud 21 presses against the curved face 18 of the tooth 17 and thus swings the keeper latch upwardly against its inherent resiliency, as shown in FIG. 2. The pushing pressure is continued until the stud passes from underneath the tooth into a position as shown in FIG. 3, whereupon the tooth returns to its initial position under downward urge of the keeper latch, and whereby the vertical face 19 of the tooth obstructs outward movement of the stud and consequently locks the end 8 within the clip.

As the normal distance between the bottom of the tooth 17 and the face 6 of the base plate is somewhat greater than the thickness of the curved end 8 there is sufficient clearance to permit required sliding and swinging movement of clip and its backing member relatively to the supporting arm 4. It will be understood, that in standard windshield wiper assembly the windshield wiper arm 4 extends vertically of the front face of an automobile windshield with its free end curved portion 8 uppermost, the windshield wiper pressure distributing superstructure 3 being substantially in alignment with the wiper arm.

To remove the pressure distributing superstructure 3 and supported squeegee wiper blade (not shown) for replacement of the member and blade, it is only necessary to manually swing the curved end 8 of the arm 4 upwardly in relation to the clip and which movement, as shown in FIG. 4, bends the keeper latch 15 upwardly against its resilience and so permits the curved end 8 of the arm to be withdrawn from the clip.

What I claim as my invention is:

1. An attachment clip for connecting a windshield wiper to a supporting arm mounted for oscillation and terminating in a curved free end portion having a concave upper face and convex lower face and a stud protruding upwardly from the concave face in the vicinity of the free end of the arm; said clip comprising a base plate having an exposed face and mounted to rest upon and be secured to the windshield wiper, a pair of spaced apart parallel flanges protruding upwardly from one end portion of the exposed face of the base plate and in conjunction with the exposed face of the base plate defining a groove having an open outer end located at one end of the plate and an inner open end located in the central portion of the exposed face of the plate, said groove providing a seat for reception of the curved end of a supporting arm and wherein the curved end extends along the groove with its convex face resting upon the portion of the exposed face of the plate located between the flanges and with its stud, which protrudes upwardly from concave face of the curved end, located beyond the open end of the groove which is located centrally of the exposed face of the plate, a resilient keeper latch positioned in alignment with the groove, one end portion of the keeper latch being attached to a portion of the base plate remote from the groove, the other end portion of the latch being free and extending to the upper portion of the groove, a tooth carried upon the free end portion of the keeper latch and extending downwardly in the vicinity of the inner open end of the groove to normally close such end against entry of the stud into the groove, the keeper latch and its tooth being capable of upward movement against the resiliency of the latch to a position wherein the tooth ceases to close the inner end of the groove against entry of the stud into the groove.

2. An attachment clip as defined in claim 1, wherein the free end portion of the keeper latch terminates in an upwardly curved convex end face which is of stubtantially complementary curvature to the curved end portion of the supporting arm.

3. An attachment clip as defined in claim 2 and for connection to the curved end of a supporting arm, which end is of substantially rectangular cross-section, and wherein the normal distance between the bottom of the tooth and the exposed face of the base plate is only slightly greater than the distance between the upper concave face and lower convex face of the curved end of the supporting arm, and the distance between the opposite faces of the flanges only slightly greater than the width of the curved end of the supporting arm.

4. An attachment clip as defined in claim 3, wherein the tooth is of two sided wedge shape and of substantially the same length as the distance between the opposite faces of the flanges, the lower portion of the upwardly curved convex end face of the latch constituting one side of the tooth, the other side of the tooth being positioned above and in substantial alignment with the inner end of the groove.

5. An attachment clip as defined in claim 4, wherein the parallel flanges are of greater height than the distance between the concave face and the convex face of the curved end of the supporting arm, the inner faces of the flanges extending upwardly to the vicinity of the upper portion of the convex end face of the keeper latch, the opposite faces of the flanges together with the portion of the exposed face of the base plate between the flanges and the convex end of the keeper latch constituting the inner faces of a socket for reception of part of the curved end portion of the supporting arm.

No references cited.